(12) United States Patent
Gennai et al.

(10) Patent No.: US 7,500,866 B2
(45) Date of Patent: Mar. 10, 2009

(54) LID WITH PROJECTIONS FOR COVERING AN OPENING FORMED AT A MOBILE COMMUNICATION TERMINAL

(75) Inventors: Katsuhiko Gennai, Higashihiroshima (JP); Kimiaki Imai, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/325,564

(22) Filed: Jan. 5, 2006

(65) Prior Publication Data

US 2006/0154520 A1 Jul. 13, 2006

(30) Foreign Application Priority Data

Jan. 13, 2005 (JP) ............... 2005-006485

(51) Int. Cl.
*H01R 13/62* (2006.01)
(52) U.S. Cl. ..................................... 439/367
(58) Field of Classification Search ............... 439/519, 439/138, 139, 145, 445, 575, 367, 587, 135, 439/142, 476.1, 483, 484
See application file for complete search history.

(56) References Cited

U.S. PATENT DOCUMENTS

| 6,036,535 | A  | * | 3/2000  | Whiteman et al. | ......... 439/519 |
| 6,065,981 | A  | * | 5/2000  | Sopotnick et al. | ......... 439/135 |
| 6,171,131 | B1 | * | 1/2001  | Lee             | ......... 439/358 |
| 6,174,199 | B1 | * | 1/2001  | Rushing         | ......... 439/575 |
| 6,338,644 | B1 | * | 1/2002  | Fritzinger et al. | ......... 439/445 |
| 6,739,897 | B1 | * | 5/2004  | Chang           | ......... 439/404 |
| 6,857,884 | B2 | * | 2/2005  | Kim et al.      | ......... 439/137 |
| 6,997,731 | B1 | * | 2/2006  | Wood et al.     | ......... 439/314 |
| 7,118,427 | B2 | * | 10/2006 | Zahnen et al.   | ......... 439/798 |
| 7,176,889 | B2 | * | 2/2007  | Baker et al.    | ......... 345/156 |
| 2002/0119697 | A1 |   | 8/2002 | Chan           |                   |
| 2003/0117788 | A1 |   | 6/2003 | Kim et al.     |                   |
| 2004/0157488 | A1 | * | 8/2004 | Yaworski et al. | ......... 439/519 |
| 2004/0258336 | A1 |   | 12/2004 | Hou           |                   |
| 2005/0014408 | A1 | * | 1/2005 | Swiatek et al. | ......... 439/215 |
| 2005/0260887 | A1 | * | 11/2005 | Lee           | ......... 439/529 |
| 2006/0178028 | A1 | * | 8/2006 | Swiatek et al. | ......... 439/215 |

FOREIGN PATENT DOCUMENTS

| JP | 10-17008 A | 1/1998 |
| JP | 10-64615 A | 3/1998 |
| JP | 11260460 A | 9/1999 |
| JP | 2001-210972 A | 8/2001 |
| JP | 2002-141991 A | 5/2002 |
| JP | 2002-190349 A | 7/2002 |
| JP | 2004-199892 A | 7/2004 |
| JP | 3100309 U | 12/2004 |
| JP | 2005-228756 A | 8/2005 |
| WO | WO-2005/076415 A1 | 8/2005 |

\* cited by examiner

*Primary Examiner*—Chandrika Prasad
(74) *Attorney, Agent, or Firm*—Birch, Stewart, Kolasch & Birch, LLP

(57) ABSTRACT

An earphone microphone terminal cover is a lid for covering an opening formed at a mobile phone body, and includes a lid portion covering the opening and located in a groove communicated with the opening; and a first projection formed at the lid portion for insertion into a concavity extending from the groove. The first projection extends outward from the lid portion, and has a contact portion for contact with the concavity, and a distance between a front surface of the lid portion and the contact portion is equal to or longer than a distance between the front and rear surfaces of the lid portion.

15 Claims, 18 Drawing Sheets

(a)

(b)

(a)

(b)

LID WITH PROJECTIONS FOR COVERING AN OPENING FORMED AT A MOBILE COMMUNICATION TERMINAL

This nonprovisional application is based on Japanese Patent Application No. 2005-006485 filed with the Japan Patent Office on Jan. 13, 2005; the entire contents of which are hereby incorporated by reference.

BACKGROUND OF THE INVENTION

1. Field of the Invention

The present invention relates to a lid for a mobile communication terminal as well as a mobile communication terminal provided with the lid, and particularly to a lid covering a charging terminal of a mobile communication terminal, an earphone microphone, a memory card slot or the like as well as a mobile communication terminal provided with the lid.

2. Description of the Background Art

A conventional mobile terminal is provided with a charging terminal, a terminal for connecting an earphone microphone and a mechanism (terminal) for mounting a memory card. These terminals and the memory card are not always used, and are configured to cover the terminals for preventing dust, water and corrosion when these are not used. Terminal covers of various structures have been proposed.

Japanese Patent Laying-Open No. 10-017008 has disclosed a hinged lid as shown in FIG. 25. Referring to FIG. 25, a hinged lid 100 is formed of a lid body 102 and a hinge 103. Lid body 102 has is a plate-like member having sizes enough to cover an opening of a battery casing 104 of an electronic calculator. Lid body 102 is provided at one end of its rear surface with a concavity 106. For covering a terminal, lid body 102 is located in a groove 104a formed at battery casing 104. A hook 105 formed at battery casing 104 is engaged with concavity 106 to prevent lateral (left to right and vice versa) sliding of hinged lid 100. Lid body 102 is provided at the other end of the rear surface with a hook 107 engaged with a concavity 110 formed at battery casing 104. Hinge 103 is a thin sheet-like member, and extends from the end of hook 107 near its rear surface. Hinge 103 is arranged in a hinge accommodating space 108 of battery casing 104, and is provided at its end with a convex stop 109.

Japanese Patent Laying-Open No. 2001-210972 has disclosed a terminal cover shown in FIG. 26. Referring to FIG. 26, a terminal cover 202 has a concave portion 202a for opening terminal cover 202 with a finger engaged with it, a lid portion 202b covering the terminal and a tongue 202c for connecting lid portion 202b to the body. Further, terminal cover 202 integrally has a tip end surface 221 of tongue 202c, inclined surfaces 222 which are in contact with a boss of a body and are guided thereby when attaching terminal cover 202, an anti-disengagement portion 223 for preventing easy disengagement of terminal cover 202 attached to the body, a guide surface 224 for guiding tongue 202c by the boss of the body in the opening or closing operation and thereby guiding entire terminal cover 202, and an elastic deformation aperture 225 which elastically deforms when attaching terminal cover 202 to the body, and thereby prevents disengagement when a small force is applied, and a terminal guide portion 227 offering a function of guiding the body with respect to the terminal. Terminal cover 202 is formed of an elastic member (e.g., rubber). When terminal cover 202 covers a plug socket (not shown) of the body, lid portion 202b is located in a groove (not shown) of the body.

Japanese Patent Laying-Open No. 2002-141991 has disclosed a connector cover portion and an earphone jack cover portion shown in FIG. 27. Referring to FIG. 27, a lower casing of a mobile phone is formed of a lower front half 320 and a lower rear half 321, and a printed board 324 is arranged in a space defined between lower front half 320 and lower rear half 321. An interface connector 314 arranged at a lower end of printed board 324 and a lower rear half 321 hold a protection member 313 therebetween. A connector cover portion 313a and an earphone jack cover portion 313b are integral with protection member 313. Connector cover portion 313a is located in a groove 316a formed at protection member 313 so that it covers interface connector 314. Likewise, earphone jack cover portion 313b is located in a groove 316b formed at lower front half 320 and a groove 316c formed at lower rear half 321 so that it covers an earphone jack 315.

Japanese Patent Laying-Open No. 2002-190349 has disclosed a terminal cover shown in FIG. 28. Referring to FIG. 28, a terminal cover 401 is integrally formed of a cover body 402 formed of a rectangular flat plate 402, and a hinge (attaching portion) 403 which is formed on one side of cover body 402 and is bent downward. Hinge 403 is formed along one side of cover body 402, is thicker than cover body 402 and is provided at its opposite end surfaces with rotation shafts 403a and 403b projecting therefrom, respectively. A mobile phone body 404 is provided at attaching portions for attaching terminal cover 401 with two shaft holes (not shown) which carry rotation shafts 403a and 403b, and serve as bearing units, respectively. When terminal cover 401 covers a terminal 411, terminal cover 401 is located in a groove 405 formed at mobile phone body 404.

In a conventional terminal cover of further another structure shown in FIGS. 30 and 31, a casing 502 containing electronic parts 510 includes function buttons 519 arranged on a top surface, and a side cabinet 505. A terminal cover 509 for covering a terminal 502a of electronic parts 510 is attached to a groove 507 of side cabinet 505. Terminal cover 509 has a projection 541 protruding outward (upward and downward in FIG. 30) from its side surface. Projection 541 is fitted into a concavity 507a extending upward in FIG. 30 from groove 507 so that terminal cover 509 is located in groove 507. Projection 541 has a contact portion 541a in contact with an inner wall of concavity 507a. Contact portion 541a is closer to a front surface 509b of terminal cover 509 than a rear surface 509a of terminal cover 509. For attaching terminal cover 509, as shown at (a) and (b) in FIG. 32, a user inserts terminal cover 509 into groove 507 while frictionally sliding projection 541 on an inner wall of groove 507. When terminal cover 509 is inserted to a position where rear surface 509a is in contact with a bottom of groove 507, projection 541 is located concavity 507a.

However, all the terminal covers disclosed in Japanese Patent Laying-Open Nos. 10-17008, 2001-210972 and 2002-141991 described above are configured such that the terminal is covered only by locating the terminal cover in the opening (groove) formed at the mobile communication terminal. Therefore, it is difficult to locate the terminal cover in the opening, and the terminal cover is liable to lift.

Further, the terminal cover disclosed in Japanese Patent Laying-Open No. 2002-190349 suffers from a similar problem. FIG. 29 shows a manier of opening and closing the terminal cover disclosed in Japanese Patent Laying-Open No. 2002-190349. Referring to FIG. 29, cover body 402 has an engagement projection 407 at its end. For covering the terminal, a user brings engagement projection 407 into contact with an upper end 404a of mobile phone body 404, and pushes cover body 402 downward to fit engagement projection 407 into an engagement concavity 408. In the terminal cover disclosed in Japanese Patent Laying-Open No. 2002-

190349, however, terminal cover 401 is provided at its end with engagement projection 407. Therefore, when the user does not push a portion near engagement projection 407, cover body 402 comes into contact with upper end 404a and thereby is curved upward so that the user cannot fit engagement projection 407 into engagement concavity 408. Consequently, it becomes difficult to locate terminal cover 401 in groove 405, and therefore terminal cover 401 is liable to lift.

Further, according to the terminal cover shown in FIGS. 30 and 31, the inner wall of groove 507 pulls projection 541 rightward in figures as shown at (a) and (b) in FIG. 33, and projection 541 may continuously undergo a pressing force without entering concavity 507a. In the terminal cover shown in FIGS. 30 and 31, therefore, it is difficult to locate terminal cover 509 in groove 507, and terminal cover 509 is liable to lift.

The above problem that the terminal cover cannot be located in the opening without difficulty, and is liable to lift commonly arises not only in the terminal cover but also in lids employed in mobile communication terminals for covering openings formed at the mobile communication terminals.

SUMMARY OF THE INVENTION

An object of the invention is to provide a lid which is used in a mobile communication terminal and can be easily located in a groove formed at the mobile communication terminal, and to provide the mobile communication terminal provided with the lid.

A lid for a mobile communication terminal according to the invention is a lid employed for covering an opening formed at the mobile communication terminal, and including a lid portion covering the opening and located in a groove communicated with the opening; and a first projection formed at the lid portion for insertion into a concavity extending from the groove. The first projection extends outward from the lid portion, and has a contact portion for contact with the concavity, and a distance between a front surface of the lid portion and the contact portion is equal to or longer than a distance between the front and rear surfaces of the lid portion.

According to the lid for the mobile communication terminal of the invention, since the distance between the front surface of the lid portion and the contact portion is equal to or longer than the distance between the front and rear surfaces of the lid portion, the first projection can be inserted to a deeper position than a conventional structure. Therefore, the first projection can be easily inserted into the concavity, and the lid can be easily located in the groove.

Preferably, in the lid for the mobile communication terminal of the invention, the first projection is formed at the rear surface of the lid portion. Thereby, the contact portion can be easily spaced from the front surface of the lid portion.

Preferably, in the lid for the mobile communication terminal of the invention, a plurality of the first projections are employed, and the plurality of first projections are arranged along an outer periphery of the lid portion, and are equally spaced from each other.

Thereby, the first projections can apply equal forces to the lid portion so that the lid portion can be stably located in the groove.

Preferably, in the lid for the mobile communication terminal of the invention, the first projection has a tip end thinner than a base end of the first projection. This structure suppresses a positional deviation when a user attempts to insert the first projection into the concavity. Therefore, the first projection can be easily inserted into the concavity.

Preferably, the lid for the mobile communication terminal of the invention further includes a second projection formed at the rear surface of the lid portion.

Thereby, in an operation of locating the lid portion in the groove, the second projection undergoes a force acting to deform the second projection when the first projection is being inserted into the concavity. A repulsive force of the second projection and a force applied to the contact portion of the first projection from the concavity can fix the lid portion in the groove.

Preferably, in the lid for the mobile communication terminal of the invention, a volume of the second projection is smaller than that of the first projection.

Thereby, the second projection has a smaller size so that the second projection can be easily deformed when locating the lid portion in the groove.

Preferably, the lid for the mobile communication terminal of the invention further includes a third projection for rotatably holding the lid portion.

Thereby, the lid portion becomes rotatable so that the terminal or the like arranged inside the opening can be used without removing the whole lid.

Preferably, the lid for the mobile communication terminal of the invention further includes an arm extending from the lid portion along the front surface of the lid portion. The third projection is formed at the rear surface of the arm.

This arm can keep a long distance between the third projection and the lid portion so that the lid portion can be turned around the third projection with a large radius.

Preferably, in the lid for the mobile communication terminal of the invention, a portion of the arm near the third projection has a thickness smaller than a thickness of a portion of the arm near a connection to the lid portion.

In this structure, the portion near the third projection can be bent and deformed more easily than the portion near the lid portion so that the terminal or the like arranged inside the opening can be exposed by removing only the lid portion without removing the third projection.

Preferably, in the lid for the mobile communication terminal of the invention, the third projection has a circular cylindrical portion and a large-diameter portion located on a tip end side with respect to the circular cylindrical portion and having a larger diameter than the circular cylindrical portion.

In this structure, the lid portion can be rotatably held by fitting the circular cylindrical portion into an aperture formed at the mobile communication terminal. Further, the large-diameter portion can prevent disengagement of the third projection from the aperture.

Preferably, in the lid for the mobile communication terminal of the invention, the third projection further has a tapered portion converging from the large-diameter portion toward the tip end.

In this structure, the large-diameter portion can be easily deformed during an operation of fitting the third projection into the aperture so that the large-diameter portion can be easily fitted into the aperture.

Preferably, the lid for the mobile communication terminal of the invention is made of at least one of elastomer and rubber.

These materials have appropriate deformability and strength, and therefore are suitable for the lid for the mobile communication terminal.

Preferably, the lid for the mobile communication terminal of the invention is a lid covering an earphone microphone terminal in the mobile communication terminal. Preferably, the lid for the mobile communication terminal of the invention is a lid covering a charging terminal in the mobile communication terminal. Preferably, the lid for the mobile communication terminal of the invention is a lid covering a memory card slot in the mobile communication terminal.

Thereby, the earphone microphone terminal, charging terminal or memory card slot is protected from dust and/of water while allowing connection of an external terminal when necessary.

Preferably, in the lid for the mobile communication terminal of the invention, the mobile communication terminal is a mobile phone. In this case, the mobile phone can have higher portability.

A mobile communication terminal according to the invention includes a mobile communication terminal body having an opening and a groove communicated with the opening, and any one of the foregoing lids for the mobile communication terminals employed for covering the opening. This structure provides the mobile communication terminal having the lid which can be easily located in the opening.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 33 shows a state in which a projection is not correctly fitted into a concavity in the operation of attaching the terminal cover shown in FIG. 31, and particularly (a) and (b) show portions D and E in FIG. 30, respectively.

DESCRIPTION OF THE PREFERRED EMBODIMENTS

Embodiments of the invention will now be described with reference to the drawings.

First Embodiment

Figure 1:
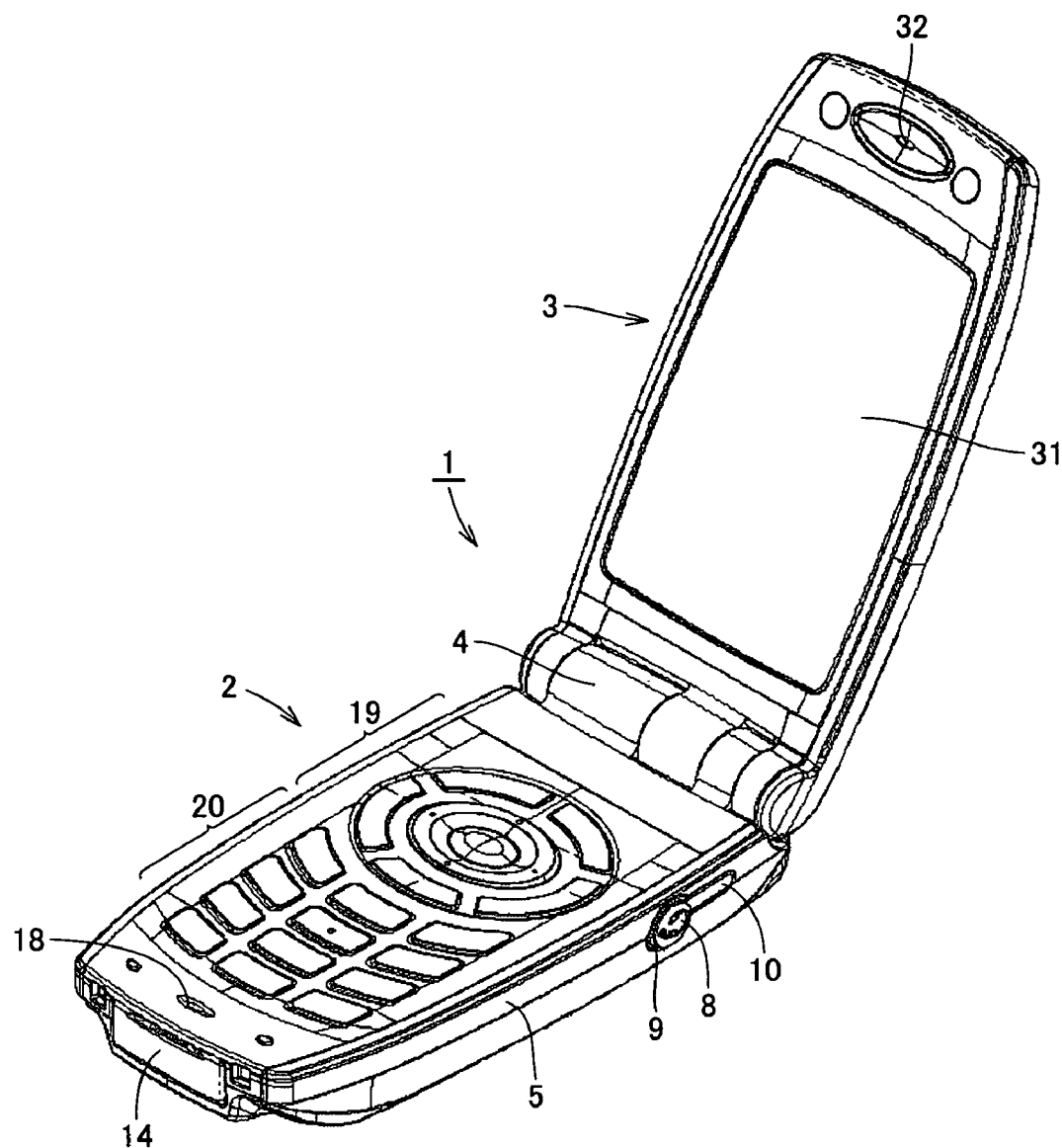
FIG. 1 is a perspective view showing an open state of a mobile phone of an embodiment of the invention.
Figure 2:
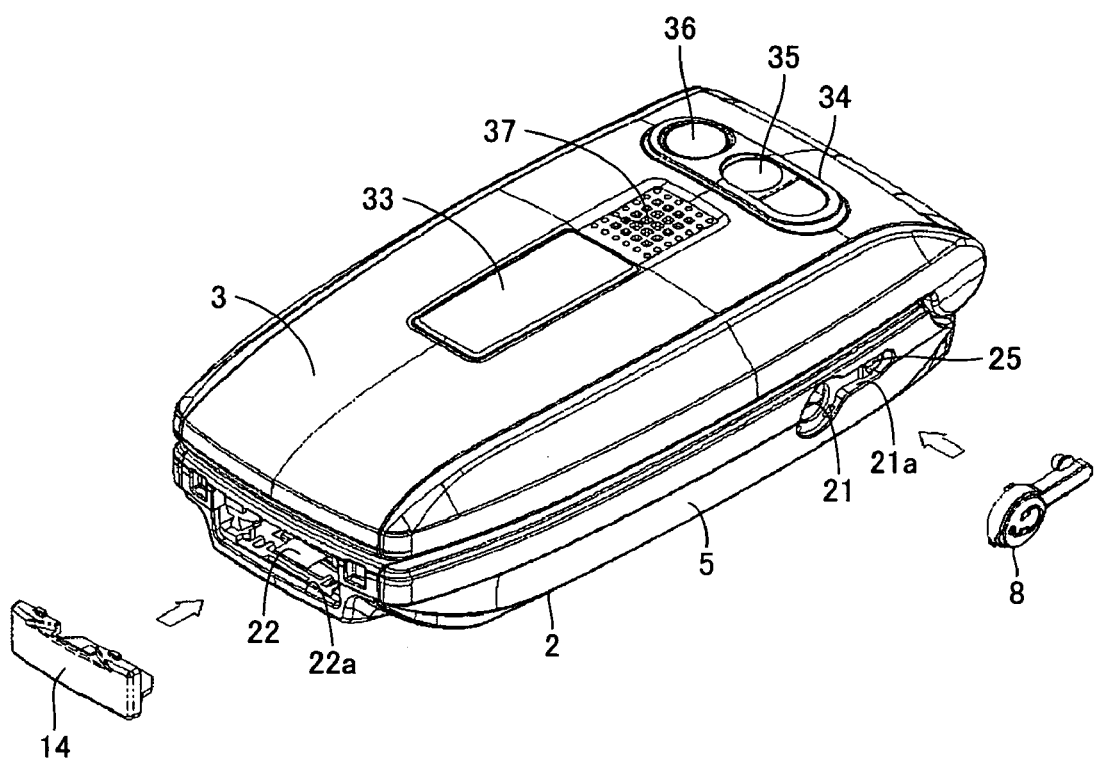
FIG. 2 is a fragmentary exploded perspective view showing a closed state of the mobile phone in FIG. 1.
Figure 3:
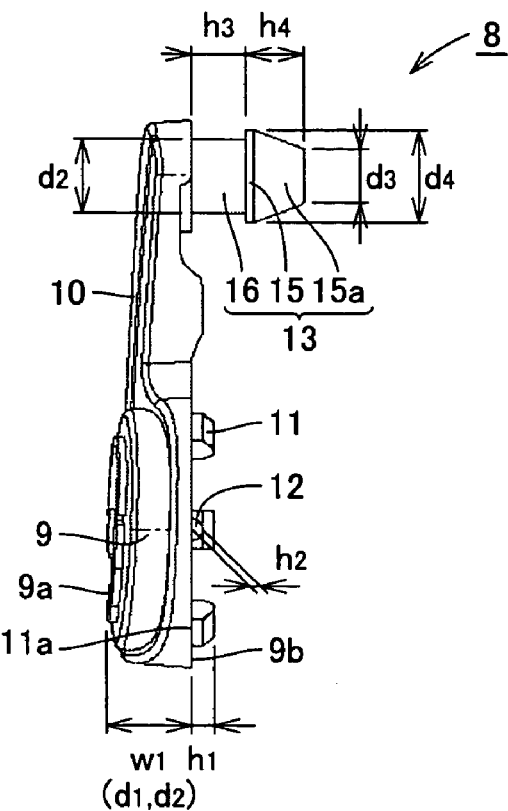
FIG. 3 is a side view showing a form of an earphone microphone terminal cover in the embodiment of the invention.
Figure 4:
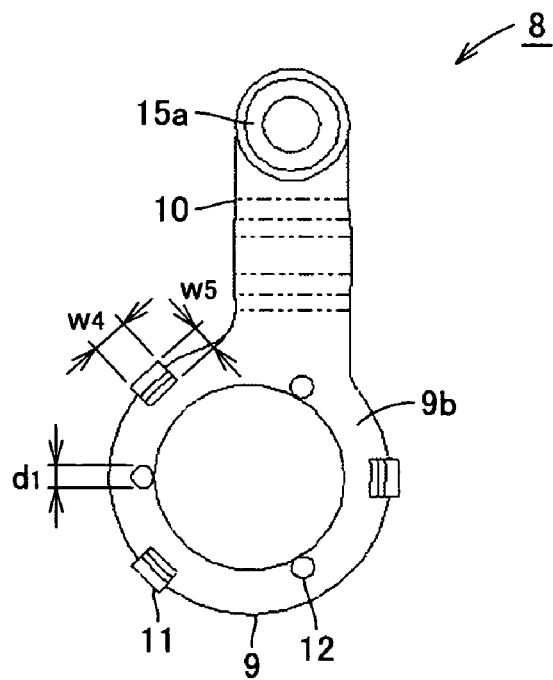
FIG. 4 is a rear plan view showing the earphone microphone terminal cover in the embodiment of the invention.
Figure 5:
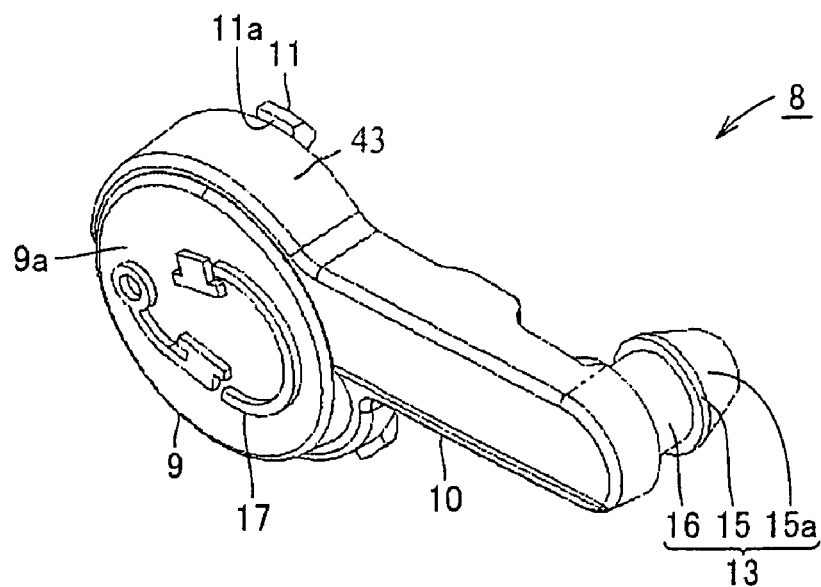
FIG. 5 is a front perspective view showing the form of the earphone microphone terminal cover in the embodiment of the invention.
Figure 6:
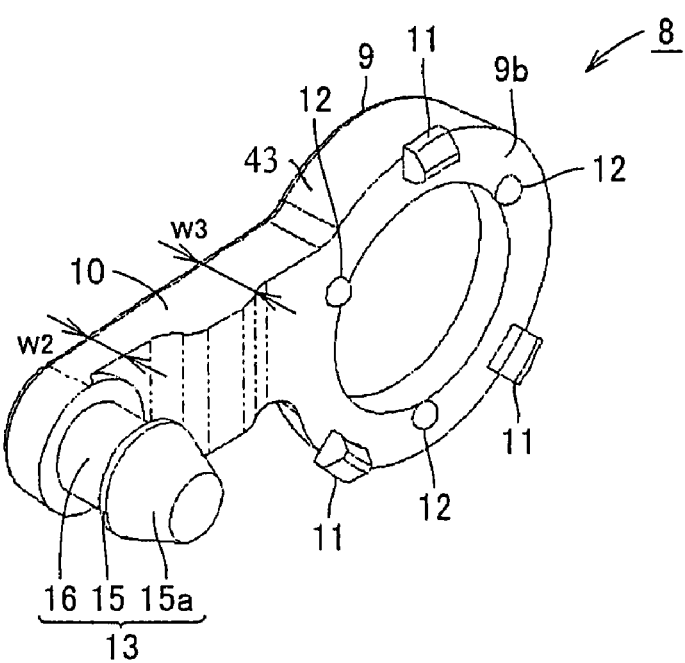
FIG. 6 is a rear perspective view showing the form of the earphone microphone terminal in the embodiment of the invention.

Referring to FIGS. 1 and 2, a mobile phone which is a mobile communication terminal of a first embodiment includes a mobile phone body 1, an earphone microphone terminal cover 8 which is a lid for a mobile communication terminal according to the invention, and a charging terminal cover 14. Mobile phone body 1 has an opening 21 of an earphone microphone terminal jack, a groove 21a communicated with opening 21, an opening 22 of a charging terminal jack and a groove 22a communicated with opening 22. Opening 21 is formed at a side cabinet 5 of mobile phone body 1, and opening 22 is formed at a bottom of mobile phone body 1. Earphone microphone terminal cover 8 is employed for opening and closing the earphone microphone terminal, and is arranged in groove 21a communicated with opening 21. Charging terminal cover 14 is employed for opening and closing opening 22 of the charging terminal jack, and is located in groove 22a communicated with opening 22. The lid of the mobile communication terminal according to the invention may also be employed for opening and closing openings such as a memory card slot of mobile phone body 1 and a connector jack in addition to earphone microphone terminal cover 8 and charging terminal cover 14. This embodiment will now be described in greater detail in connection with earphone microphone terminal cover 8.

Referring to FIGS. 3 to 7, earphone microphone terminal cover 8 is made of elastomer such as TPE (Thermoplastic Elastomer) or TPEE (Thermoplastic Polyester Elastomer), or rubber. Earphone microphone terminal cover 8 includes a lid portion 9, an arm 10 and first, second and third projections 11, 12 and 13.

Lid portion 9 is employed for covering opening 21, and has a substantially circular plane form. Lid portion 9 has a circular peripheral portion of a uniform thickness $w_1$ of about 1 mm and a central portion thinner than the peripheral portion, and thus has a cap-like form. Lid portion 9 is provided at its front surface 9a with an engraving 17 of an earphone.

Lid portion 9 is provided at its rear surface 9b with three first projections 11. First projections 11 are arranged along an outer periphery of lid portion 9, and are equally spaced from each other. Each of first projections 11 projects radially outward from a portion near the end of rear surface 9b. Each of first projections 11 has a radial section (i.e., a section in a radial direction of lid portion 9) which is formed of a rectangle and a triangle. In other words, first projection 11 has a tip end thinner than its base end. For example, first projection 11 has following sizes. The base end has a longitudinal width $w_4$ of 1 mm, a lateral width $w_5$ of 0.7 mm and a height $h_1$ of 0.6 mm.

Figure 7:
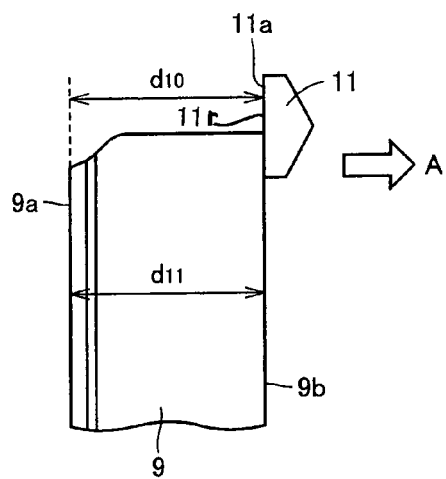
FIG. 7 shows, on an enlarged scale, a portion near a first projection.

First projection 11 has a contact portion 11a to be in contact with a concavity 23 (FIG. 8) formed at mobile phone body 1. Referring particularly to FIG. 7, contact portion 11a of first projection 11 projects from a circular portion of lid portion 9 and has a rear surface 11r. A distance $d_{10}$ between front surface 9a (strictly speaking, a plane containing front surface 9a) of lid portion 9 and rear surface 11r of contact portion 11a is equal to a distance $d_{11}$ between front and rear surfaces 9a and 9b of lid portion 9, and each of distances $d_{10}$ and $d_{11}$ is equal to thickness $w_1$ of lid portion 9. Although distances $d_{10}$ and $d_{11}$ are equal to each other in this embodiment, it is merely required in this invention that distance $d_{10}$ is equal to or longer than distance $d_{11}$. Thus, a position of contact portion 11a in FIG. 7 may be shifted in a direction of an arrow A in FIG. 7 to increase distance $d_{10}$.

Lid portion 9 is provided at its rear surface 9b with three second projections 12. Second projections 12 are arranged along the outer periphery of lid portion 9, and are equally spaced from each other. Distances between the neighboring first and second projections 11 and 12 are equal to each other. Distances from each second projection 12 to neighboring first projections 11 are equal to each other, and are equal to the corresponding distances between other second projections 12 and neighboring first projections 11. For example, second projection 12 has the following sizes. A diameter $d_1$ of the base end is 0.3 mm, and a height $h_2$ is 0.3 mm. Second projection 12 has a tip end of a hemispheric form of 0.3 mm in diameter.

Arm 10 extends from a portion of lid portion 9 along front surface 9a of lid portion 9, and has a form formed of a rectangle and a semicircle in a plan view. Arm 10 is provided at its end portion having a semicircular plane form with a third projection 13. A portion of arm 10 near third projection 13 has a thickness $W_2$ smaller than a thickness $W_3$ of a portion of arm 10 near the connection to lid portion 9. For example, arm 10 has the following sizes. A portion near third projection 13 has a sectional form of a rectangle having a width of 3 mm and a thickness $w_2$ of 1 mm. A portion near the connection to lid portion 9 has a sectional form of a rectangle having a width of 3 mm and a thickness $w_3$ of 2 mm. The thickness changes from 1 mm to 2 mm for the purpose of allowing bending of arm 10 at a portion near third projection 13 when lid portion 9 of earphone microphone terminal cover 8 receives a bending force from a user's finger.

Third projection 13 has a circular cylindrical portion 16, a large-diameter portion 15 and a tapered portion 15a. Large-diameter portion 15 is located on the tip side of third projection 13 with respect to circular cylindrical portion 16, and has a larger diameter than circular cylindrical portion 16. Tapered portion 15a converges from large-diameter portion 15 toward the tip end of third projection 13. For examples, third projection 13 has the following sizes. Circular cylindrical portion 16 has a diameter $d_2$ of 2 mm and a height $h_3$ of 1.5 mm. Large-diameter portion 15 has a diameter $d_4$ of 2.5 mm. Tapered portion 15a has a tip end of a width $d_3$ of 1.5 mm. A height $h_4$ from large-diameter portion 15 to tapered portion 15a is 1.5 mm.

Referring to FIGS. 1 to 8, groove 21a of side cabinet 5 has a form into which earphone microphone terminal cover 8 can be closely fitted. On a left side of groove 21a in FIG. 8, opening 21 is formed in communication with groove 21a. Opening 21 is provided at its outer periphery with three concavities 23 extending from groove 21a. On a right side in FIG. 8 of groove 21a, an aperture 25 is formed in communication with groove 21a. Concavities 23 are employed for inserting first projections 11, respectively. Aperture 25 is provided for inserting third projection 13 thereinto. Lid portion 9 can be rotatably held by inserting third projection 13 into aperture 25 to allow rotation around third projection 13. For example, each concavity 23 has a longitudinal thickness $w_6$ of 1.5 mm and a lateral thickness $w_7$ of 1.0 mm, and aperture 25 has a diameter $d_5$ of 2.5 mm.

Description will now be given on a manner of attaching earphone microphone terminal cover 8 and a manner of opening and closing lid portion 9 in this embodiment.

Figure 8:
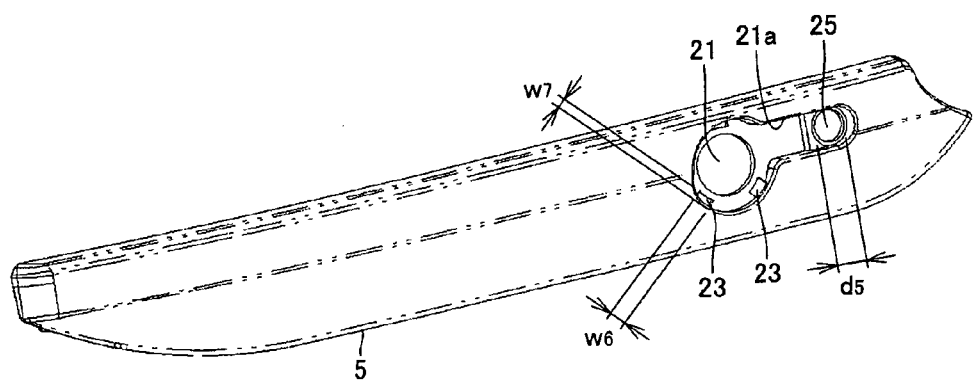
FIG. 8 shows an opening to be covered with the earphone microphone terminal cover.
Figure 9:
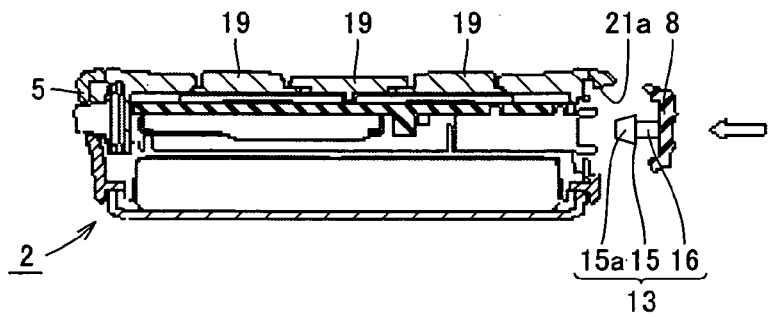
FIG. 9 is a cross section showing a manner of attaching the earphone microphone terminal cover.
Figure 10:
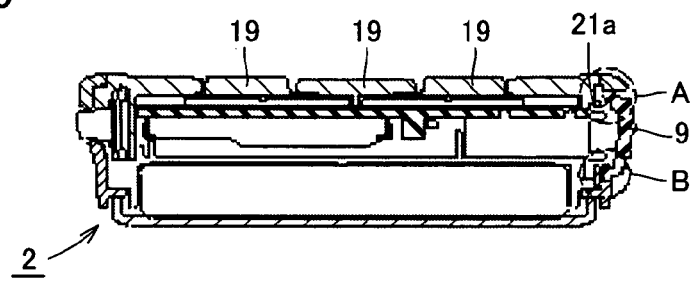
FIG. 10 is a cross section showing a structure having the earphone microphone terminal cover attached thereto.

Referring to FIGS. 8 and 9, third projection 13 of earphone microphone terminal cover 8 is inserted into aperture 25 formed at side cabinet 5 for attaching earphone microphone terminal cover 8. Although large-diameter portion 15 has a larger diameter than aperture 25, large-diameter portion 15 deforms when tapered portion 15a is first inserted into aperture 25 so that large-diameter portion 15 will be easily inserted into aperture 25. Large-diameter portion 15 prevents third projection 13 from disengaging from aperture 25. FIG. 10 shows a state in which earphone microphone terminal cover 8 is attached.

Figure 11:
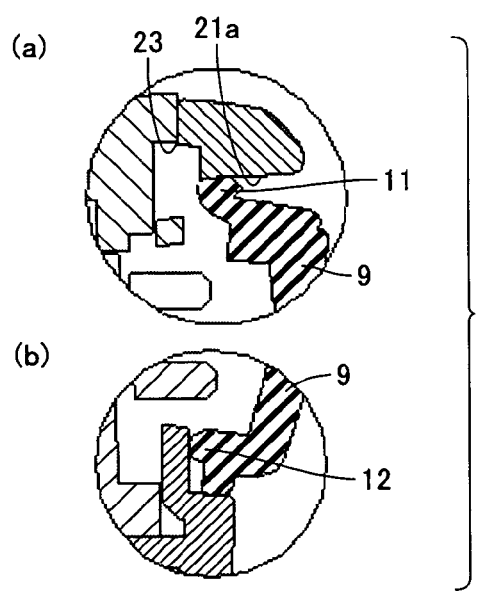
FIG. 11 is a cross section showing, on an enlarged scale, a first state in a lid portion closing operation, and particularly (a) and (b) show portions A and B in FIG. 10, respectively.

For closing lid portion 9 (i.e., covering opening 21), lid portion 9 in the position shown in FIG. 10 is pushed toward opening 21. Thereby, as shown at (a) and (b) in FIG. 11, first projection 11 moves toward concavity 23 while frictionally sliding on the inner wall of groove 21a. Second projection 12 is collapsed by the bottom of groove 21a.

Figure 12:
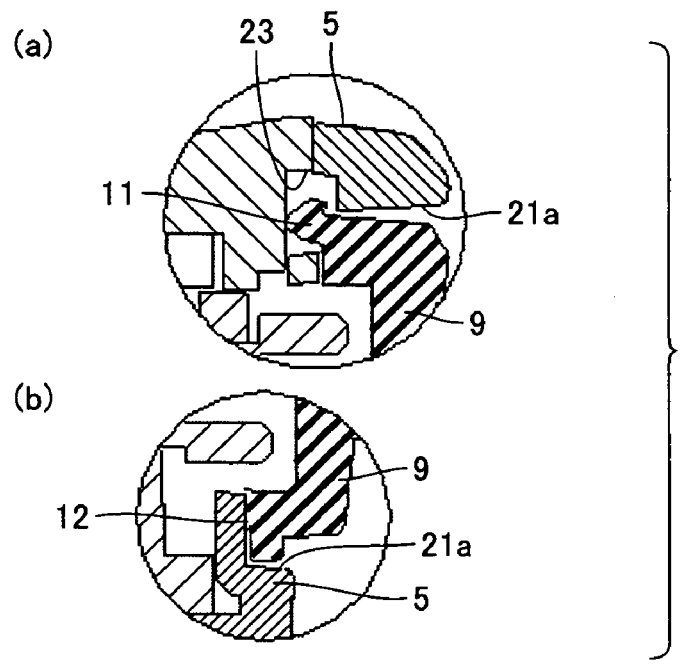
FIG. 12 is a cross section showing, on an enlarged scale, a second state in the lid portion closing operation, and particularly (a) and (b) show portions A and B in FIG. 10, respectively.

Referring to (a) and (b) in FIG. 12, by further pushing lid portion 9, first projection 11 is moved to concavity 23. Thereby, first projection 11 is inserted in concavity 23. Second projection 12 is further collapsed by the bottom of groove 21a.

Figure 13:
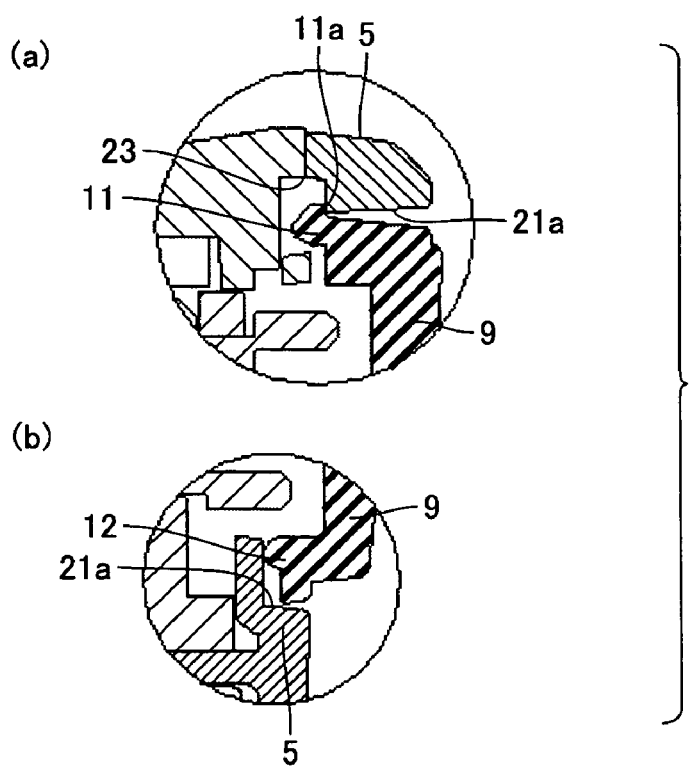
FIG. 13 is a cross section showing, on an enlarged scale, a third state in the lid portion closing operation, and particularly (a) and (b) show portions A and B in FIG. 10, respectively.

Referring to (a) and (b) in FIG. 13, when a user stops pushing of lid portion 9, second projection 12 tends to return to the initial form. By a repulsion force in this operation, first projection 11 slightly moves outward (rightward at (a) in FIG. 13), and contact portion 11a of first projection 11 comes into contact with the inner wall of concavity 23. In this operation, first projection 11 receives a leftward force at (a) in FIG. 13 from concavity 23. Thus, such a state is kept that a repulsion force of second projection 12 does not become zero. Consequently, the repulsion force of second projection 12 and the force applied to first projection 11 from concavity 23 fix lid portion 9 in groove 21a.

For opening lid portion 9 (exposing opening 21), the user pulls lid portion 9 outward from the position shown at (a) and (b) in FIG. 13. Thereby, first projection 11 moves outward while frictionally sliding on the inner wall of groove 21a so that lid portion 9 is disengaged from groove 21a. In FIG. 13(a), rear surface 11r (see FIG. 7) of contact portion 11a is in contact with side cabinet 5 of mobile phone body 1.

Mobile phone body 1 of the embodiment may be, e.g., of a foldable type. This type of mobile phone body 1 has a structure which will now be briefly described.

Referring to FIGS. 1 and 2, the foldable type of mobile phone body 1 of the embodiment has first and second casings 2 and 3 as well as a hinge 4. Hinge 4 couples first and second casings 2 and 3 together for opening and closing. In addition to earphone microphone terminal cover 8 and charging terminal cover 14, first casing 2 is provided at its front surface a function button unit 19 for performing various kinds of setting and function selection in the mobile phone, an input button unit 20 formed of keys for entering numerics and characters, a microphone unit 18 used for conversation or the like and others. First casing 2 is also provided at its side surface with side cabinet 5 which is an assembly part of first casing 2, and allows attachment of earphone microphone terminal cover 8. Second casing 3 is provided at its front surface with a display 31, a receiver 32 and others, and is provided at its rear surface with a display 33, a camera unit 34 formed of a flash 35 and a camera 36, a loud speaker 37 and the like.

According to earphone microphone terminal cover 8 of the embodiment, distance $d_{10}$ between front surface 9a of lid portion 9 and contact portion 11a is equal to or longer than distance $d_{11}$ between front and rear surfaces 9a and 9b of lid portion 9 so that first projection 11 can be inserted more deeply than a conventional structure, and can be easily inserted into concavity 23. Therefore, it becomes easy to insert first projection 11 into concavity 23 and to locate earphone microphone terminal cover 8 in groove 21a.

In earphone microphone terminal cover 8 of the embodiment, first projection 11 is formed at rear surface 9b of lid portion 9. Thereby, the contact portion can be spaced from front surface 9a of lid portion 9 without difficulty so that distance $d_{10}$ between front surface 9a of lid portion 9 and contact portion 11a can be increased by a simple form.

Earphone microphone terminal cover 8 of this embodiment employs the plurality of first projections 11, which are arranged along the outer periphery of lid portion 9 and are equally spaced from each other.

Thereby, a uniform force in a direction of the depth of groove 21a (leftward at (a) in FIG. 13) can be applied to lid portion 9 from each contact portion 11a of first projection 11 in contact with concavity 23. Therefore, lid portion 9 can be stably located in groove 21a.

In earphone microphone terminal cover 8 of the embodiment, first projection 11 has the tip end thinner than its base end. This suppresses positional deviation when first projection 11 is being inserted into concavity 23, and facilitates the inserting operation.

Earphone microphone terminal cover 8 of the embodiment further has the second projections formed at the rear surface of lid portion 9.

Thereby, in the operation of locating lid portion 9 in groove 21a, first projection 11 is inserted into concavity 23 while applying a force (leftward force at (a) in FIG. 13) acting to collapse second projection 12 by pushing second projection 12 against the bottom of groove 21a. The repulsion force (rightward force at (a) in FIG. 13) of second projection 12 for returning to the initial form and the force applied to contact portion 11a of first projection 11 from concavity 23 can fix lid portion 9 in groove 21a.

In earphone microphone terminal cover 8 of the embodiment, second projection 12 has a smaller volume that first projection 11.

Thereby, second projection 12 has small sizes so that second projection 12 can be easily deformed when locating lid portion 9 in groove 21a.

Earphone microphone terminal cover 8 of the embodiment further includes third projection 13 for rotatably holding lid portion 9.

Thereby, lid portion 9 is rotatable so that the earphone microphone terminal located in opening 21 can be used by removing only lid portion 9, and it is not necessary to remove whole earphone microphone terminal cover 8.

Earphone microphone terminal cover 8 of the embodiment further includes arm 10 extending from lid portion 9 along front surface 9a of lid portion 9. Third projection 13 formed at the rear surface of arm 10.

In this structure, a long distance can be kept between third projection 13 and lid portion 9 owing to arm 10 so that lid portion 9 can be turned around third projection 13 to a large extent.

In earphone microphone terminal cover 9 of the embodiment, the portion of arm 10 near third projection 13 has thickness $w_2$ smaller than thickness $w_3$ of the portion of arm 10 near the connection to lid portion 9.

Thereby, the portion near third projection 13 can be bent more easily than the portion near lid portion 9 so that the earphone microphone terminal located in opening 21 can be easily exposed by removing only lid portion 9 without removing third projection 13.

In earphone microphone terminal cover 8 of the embodiment, third projection 13 has circular cylindrical portion 16 and large-diameter portion 15 which is located on the tip end side of circular cylindrical portion 16, and has diameter $d_4$ larger than diameter $d_2$ of circular cylindrical portion 16.

In this structure, lid portion 9 can be held rotatable by inserting circular cylindrical portion 16 into aperture 25. Also, large-diameter portion 15 can prevent disengagement of third projection 13 from aperture 25.

In earphone microphone terminal cover 8 of the embodiment, third projection 13 further has tapered portion 15a converging from large-diameter portion 15 toward the tip end.

Thereby, large-diameter portion 15 can easily deform during an operation of inserting third projection 13 into aperture 25 so that large-diameter portion 15 can be easily inserted into aperture 25.

Earphone microphone terminal cover 8 is made of at least one of elastomer and rubber.

These materials have appropriate bendability and strength, and therefore are suitable for use as the material of earphone microphone terminal cover 8.

The mobile phone in this embodiment includes mobile phone body 1 having opening 21 and groove 21a communicated with opening 21, and earphone microphone terminal cover 8 for covering opening 21. This structure provides the mobile phone in which earphone microphone terminal cover 8 can be easily located in groove 21a.

Figure 14:
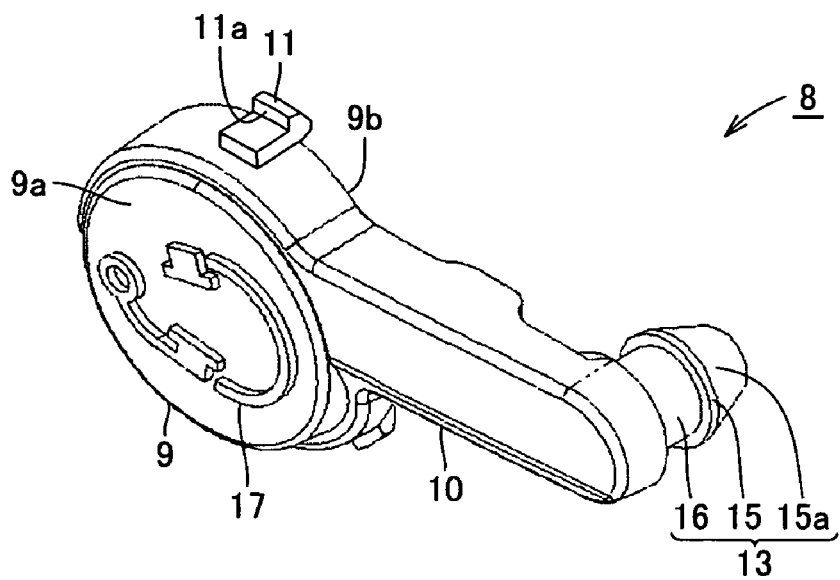
FIG. 14 is a front perspective view showing another form of the earphone microphone terminal cover in the embodiment of the invention.

In this embodiment, first projection 11 is formed at rear surface 9b of lid portion 9. According to the invention, however, first projection 11 may be formed at the side surface of lid portion 9 as shown in FIG. 14. Naturally, earphone microphone terminal cover 8 shown in FIG. 14 is likewise configured such that the distance between front surface 9a of lid portion 9 and contact portion 11a is equal to or longer than the distance between front and rear surfaces 9a and 9b of lid portion 9.

Second Embodiment

Referring to FIGS. 1 and 2, a second embodiment will now be described in connection with charging terminal cover 14 in greater detail. Charging terminal cover 14 is different in form from earphone microphone terminal cover 8, but includes first and second projections similarly to earphone microphone terminal cover 8, and charging terminal cover 14 corresponds to the lid for the mobile communication terminal according to the invention.

Referring to FIGS. 1, 2 and 15-19, charging terminal cover 14 is made of rubber-containing resin (elastomer) such as TPE or TPEE, or rubber. Charging terminal cover 14 primarily includes a lid portion 57, first and second projections 51 and 52, and a tongue 56. Lid portion 57 and tongue 56 are coupled perpendicularly to each other.

Figure 15:
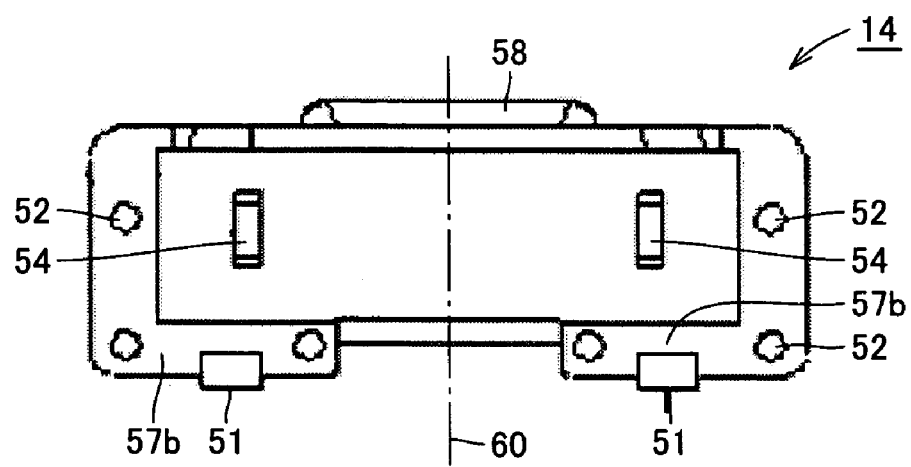
FIG. 15 is a bottom view showing a form of a charging terminal cover in the embodiment of the invention.
Figure 16:
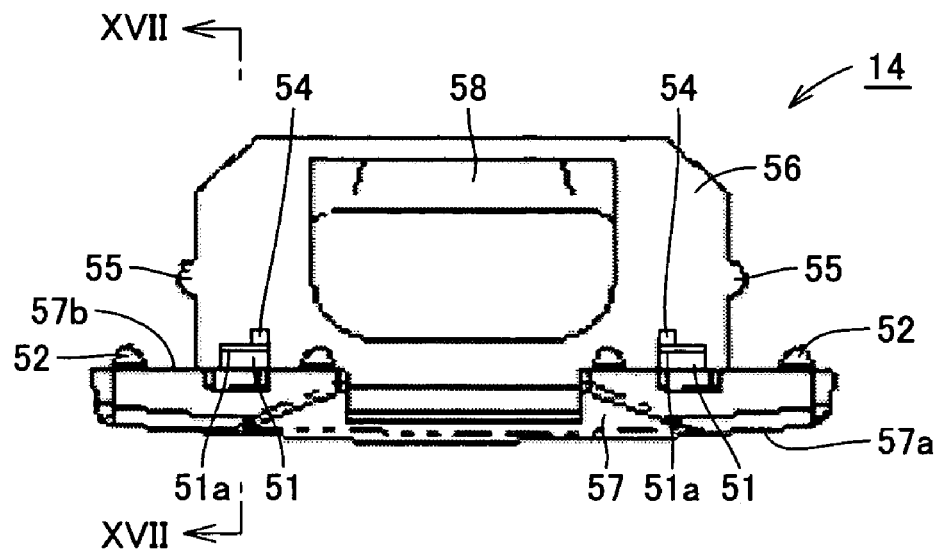
FIG. 16 is a side view showing one side of the charging terminal cover in the embodiment of the invention.

Lid portion 57 is employed for covering opening 22, and has a substantially rectangular plane form. Referring particularly to FIG. 15, lid portion 57 has an outer peripheral portion having a relatively large thickness and a central portion which is surrounded by the outer peripheral portion and is thinner than it. A surface of the outer peripheral portion forms a rear surface 57b of lid portion 57.

Figure 17:
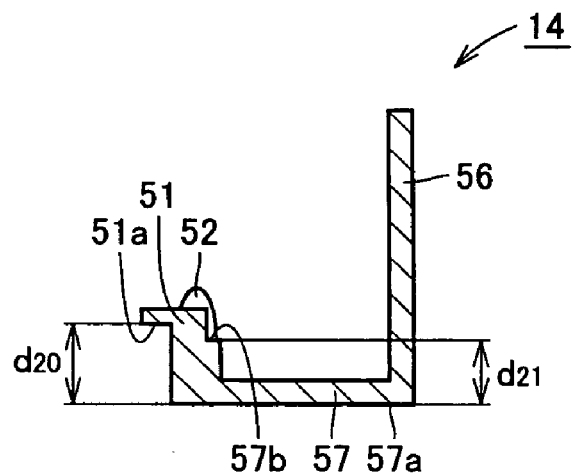
FIG. 17 is a cross section taken along line XVII—XVII in FIG. 16.
Figure 18:
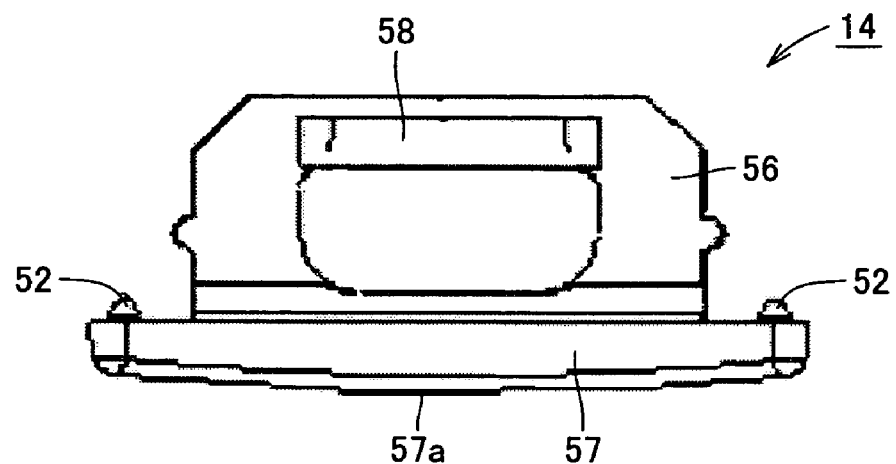
FIG. 18 is a side view showing the other side of the charging terminal cover in the embodiment of the invention.
Figure 19:
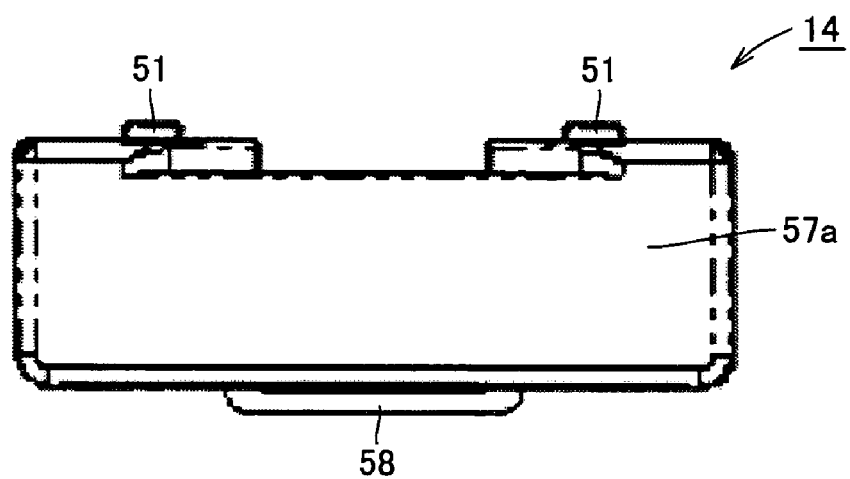
FIG. 19 is a front plan view showing a form of the charging terminal cover in the embodiment of the invention.

Lid portion 57 is provided at its rear surface 57b with two first projections 51 which are symmetric with respect to imaginary line 60. Referring particularly to FIG. 17, each first projection 57 has an L-shaped sectional form, and extends outward from an end of rear surface 57b. First projection 51 has a contact portion 51a for contact with a concavity 24 (FIG. 22) formed at mobile phone body 1. Contact portion 51a is a portion of first projection 51, and projects outward beyond the rectangle defined by lid portion 57. In this embodiment, a distance $d_{20}$ between a front surface 57a of lid portion 57 (a plane including front surface 57a of lid portion 57) and contact portion 51a is longer than a distance $d_{21}$ between front and rear surfaces 57a and 57b of lid portion 57. In the invention, it is merely required that distance $d_{20}$ is equal to or longer than distance $d_{21}$, and thus distance $d_{20}$ may be equal to distance $d_{21}$.

Lid portion 57 is provided at its rear surface 57b with six second projections 52 which are symmetric with respect to imaginary line 60. In this embodiment, each second projection 52 is higher than first projection 51.

Lid portion 57 is provided at its central portion with two projections 54 which are symmetric with respect to imaginary line 60. Projections 54 are provided for inserting them into a charging terminal arranged in opening 22 when the charging terminal is not used. Projections 54 inserted into the charging terminal can position charging terminal cover 14, and can prevent rattling. Tongue 56 is a portion to be inserted into opening 22 when charging terminal cover 14 is located in groove 22a of opening 22. Tongue 56 is provided with two projections 55 and 58, which are inserted into opening 22 for preventing disengagement of charging terminal cover 14 from groove 22a of opening 22.

A manner of attaching charging terminal cover 14 of the embodiment will now be described.

Figure 20:
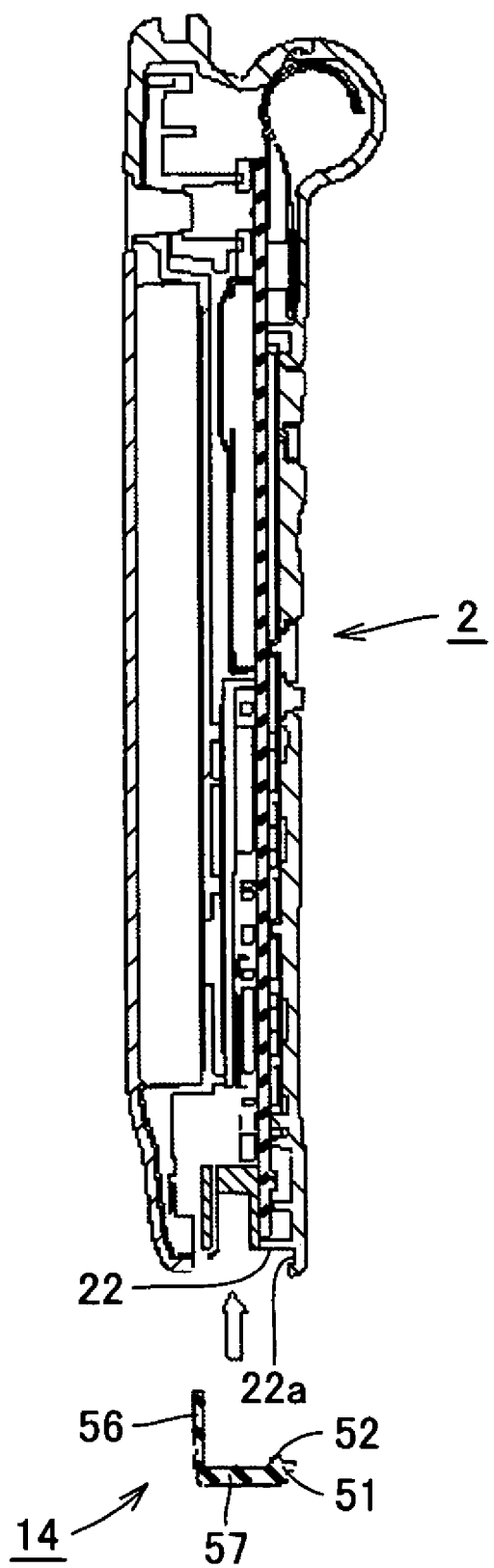
FIG. 20 is a cross section showing a first state in the operation of attaching the charging terminal cover.
Figure 21:
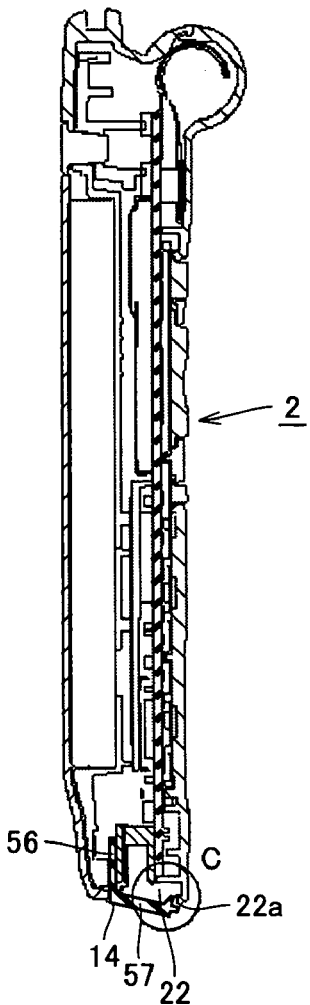
FIG. 21 is a cross section showing a second state in the operation of attaching the charging terminal cover.

Referring to FIG. 20, tongue 56 is first inserted into opening 22. FIG. 21 shows charging terminal cover 14 of which tongue 56 is already inserted into opening 22.

Figure 22:
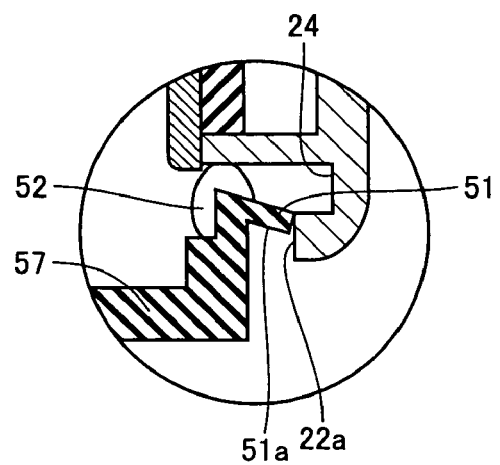
FIG. 22 is a cross section showing, on an enlarged scale, a third state in the operation of attaching the charging terminal cover, and particularly showing a portion C in FIG. 21.

Subsequently, lid portion 57 is pushed toward opening 22. Thereby, as shown in FIG. 22, first projection 51 moves toward concavity 24 while frictionally sliding on the inner wall of groove 22a. Second projection 52 is collapsed by the bottom of groove 22a.

Figure 23:
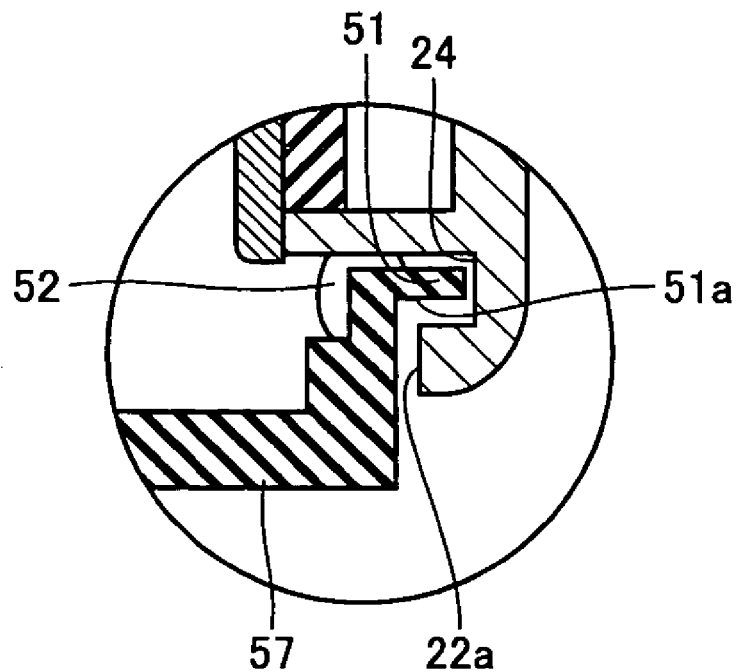
FIG. 23 is a cross section showing, on an enlarged scale, a fourth state in the operation of attaching the charging terminal cover, and particularly showing the portion C in FIG. 21.

By pushing lid portion 57, first projection 51 reaches concavity 24 as shown in FIG. 23. Thereby, first projection 51 is inserted into concavity 24. Second projection 52 is further collapsed by the bottom of groove 22a.

When the user stops pushing of lid portion 57 thereafter, second projection 52 tends to return to the initial form. This causes a repulsion force, which slightly moves first projection 51 outward (downward in the figure) so that contact portion 51a of first projection 51 comes into contact with the inner wall of concavity 24. In this operation, first projection 51 receives a force directed upward in the figure from concavity 24. Thus, such a state is kept that the repulsion force of second projection 52 does not become zero. Consequently, the repulsion force of second projection 52 and the force applied to first projection 51 from concavity 24 fix lid portion 57 in groove 22a.

Figure 24:
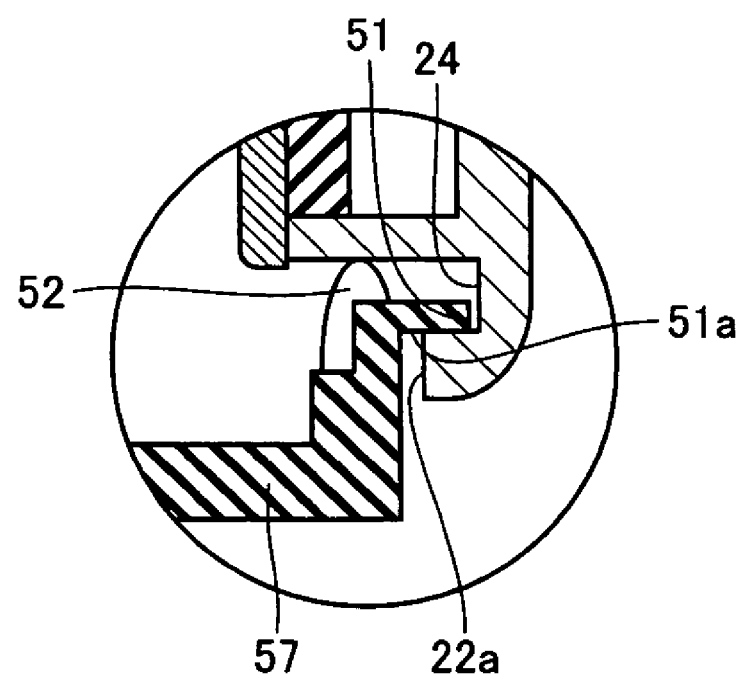
FIG. 24 is a cross section showing, on an enlarged scale, a fifth state in the operation of attaching the charging terminal cover, and particularly showing the portion C in FIG. 21.
Figure 25:
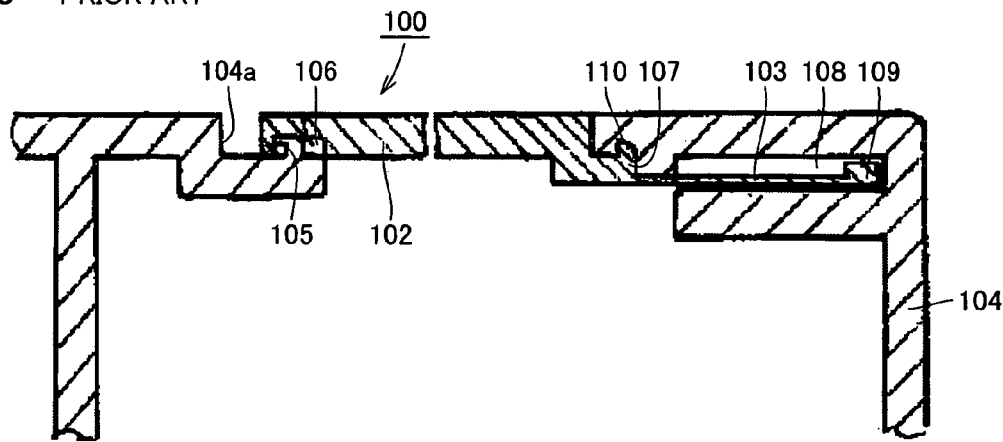
FIG. 25 is a cross section showing a structure of a conventional terminal cover.
Figure 26:
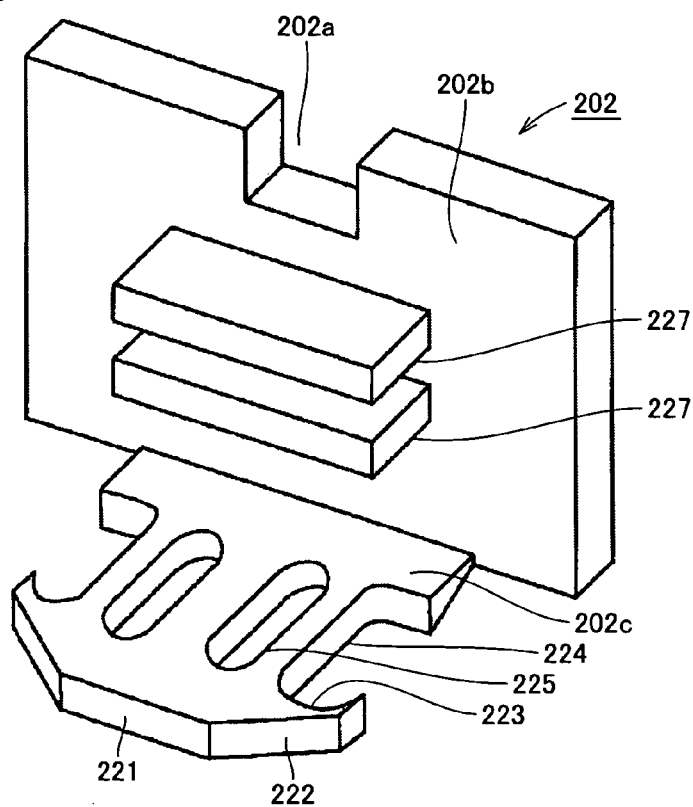
FIG. 26 is a perspective view showing a structure of another conventional terminal cover.
Figure 27:
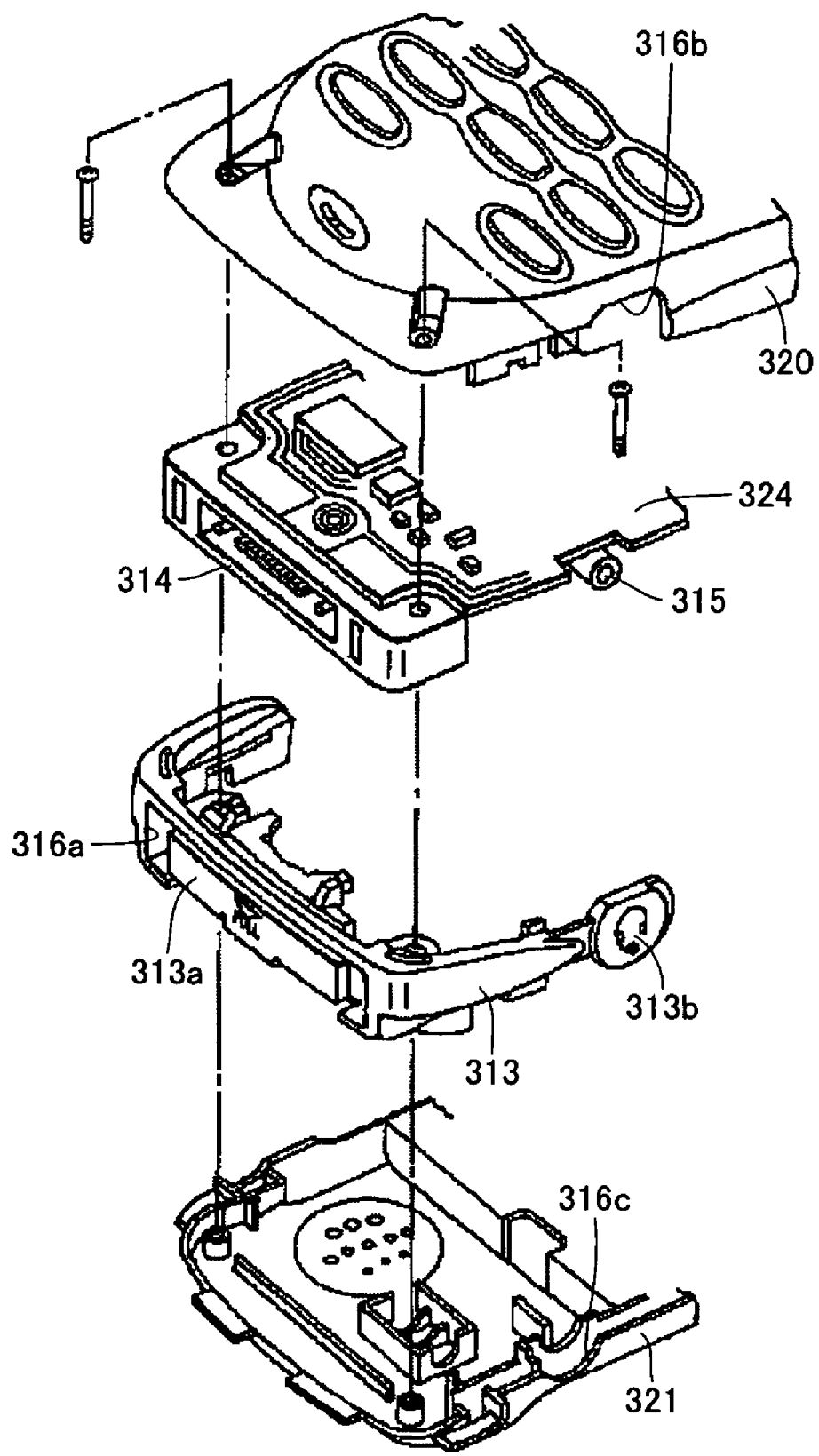
FIG. 27 is an exploded perspective view showing a structure of still another conventional terminal cover.
Figure 28:
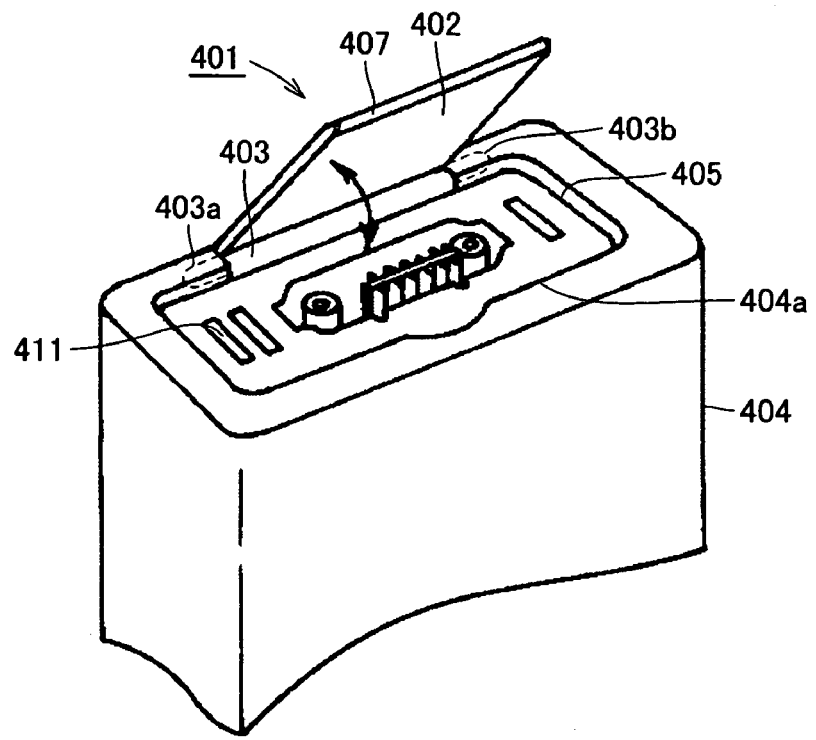
FIG. 28 is a perspective view showing a structure of yet another conventional terminal cover.
Figure 29:
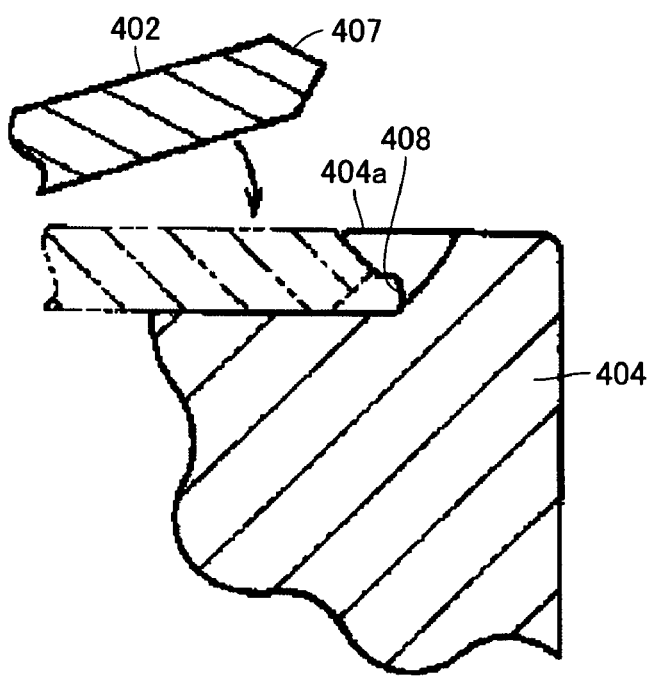
FIG. 29 shows a manner of opening and closing the terminal cover shown in FIG. 28.
Figure 30:
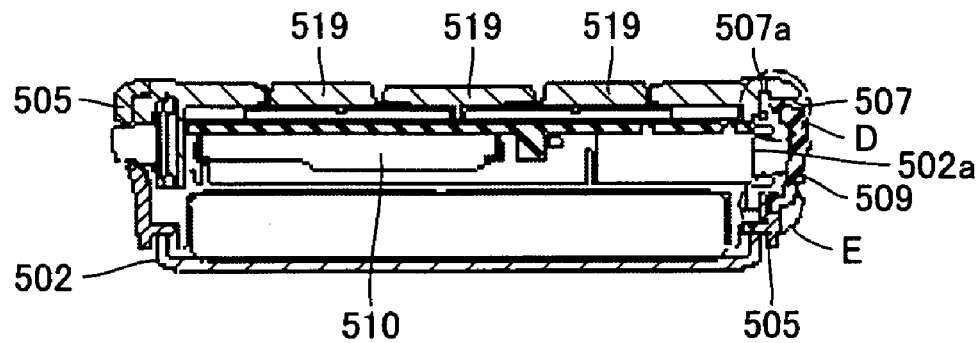
FIG. 30 is a cross section showing further another conventional terminal cover attached to a casing.
Figure 31:
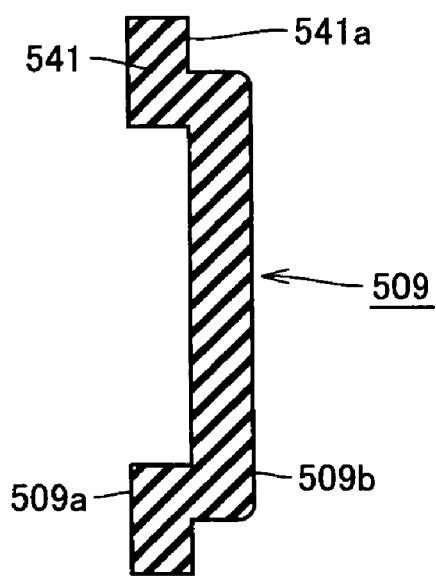
FIG. 31 is a cross section showing a structure of a further conventional terminal cover.
Figure 32:
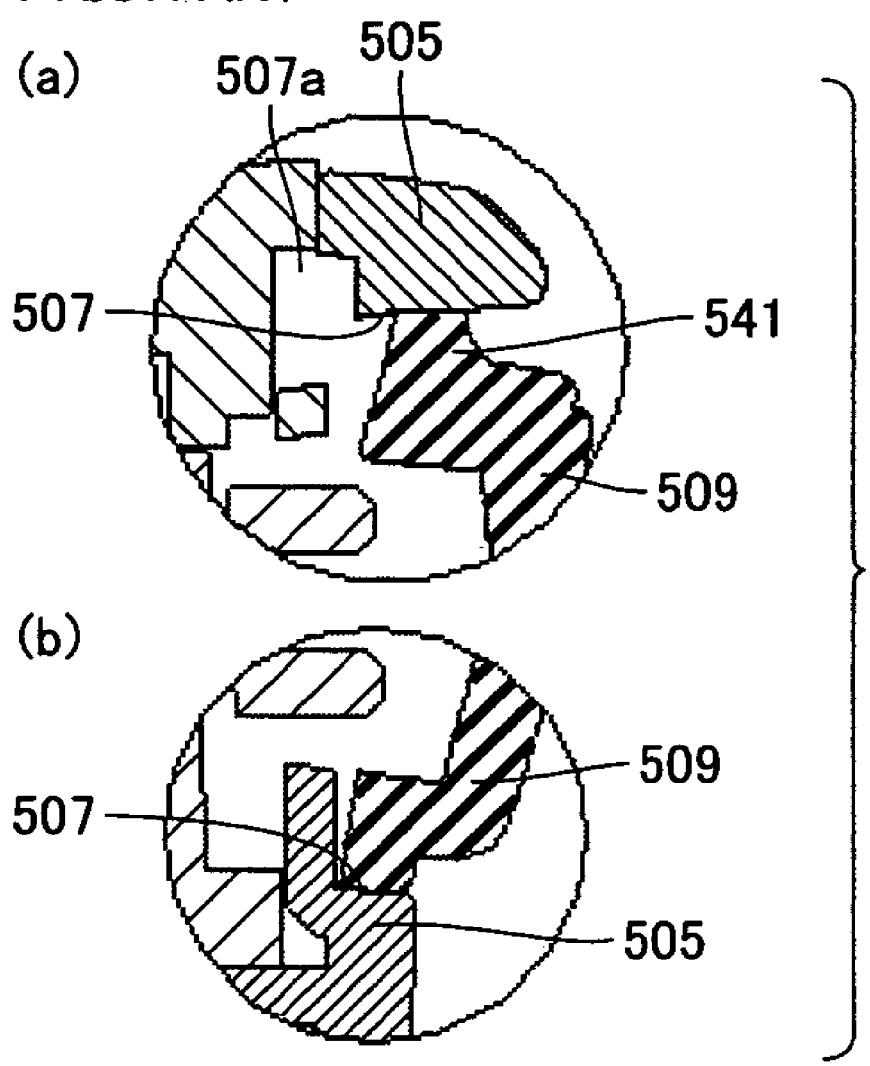
FIG. 32 shows a state of the terminal cover during an operation of attaching the terminal cover shown in FIG. 31, and particularly (a) and (b) show portions D and E in FIG. 30, respectively.

When lid portion 57 opens (opening 22 is exposed), lid portion 57 in the state shown in FIG. 24 is pulled outward. Thereby, first projection 51 moves outward while frictionally sliding on the inner wall of groove 22a so that charging terminal cover 14 is disengaged from groove 22a.

Charging terminal cover 14 of the embodiment can achieve effects similar to those of earphone microphone terminal cover 8 of the first embodiment.

The above description has been given on the foldable type of mobile phone. However, the invention is not restricted to this, and may be applied to a straight type of mobile phone and a flip type of mobile phone.

In this embodiment, the mobile phone has been described as an example of the portable information terminal. However, the invention is not restricted to this, and may be applied to a PDA (Personal Data Assistant), a notebook personal computer, a digital camera capable of communication and others.

The lids for the portable information terminal are, e.g., the earphone microphone terminal cover and the charging terminal cover, but may be lids for a data storage card slot and the like provided that the lid covers an opening formed at the mobile communication terminal.

The invention can be applied to the lids covering the charging terminal, the earphone microphone terminal and/or the memory card slot of the mobile communication terminal, and to the mobile communication terminals provided with them.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lid for a mobile communication terminal for covering an opening formed at the mobile communication terminal comprising:

a lid portion for covering an opening formed in the mobile communication terminal; and a first projection and a second projection, different from the first projection, formed at a rear surface of said lid portion, wherein said first projection projects from a side surface of said lid portion and has a contact portion at a position proximate the rear surface of said lid portion, and said contact portion has a surface facing towards a front surface of said lid portion, said surface of the contact portion is for contacting with said mobile communication terminal, and a distance between the front surface of said lid portion and said surface of said contact portion is equal to or longer than a distance between the front and rear surfaces of said lid portion, and a repulsion force of said second projection fixes said lid portion in said mobile communication terminal.

2. The lid for the mobile communication terminal according to claim 1, wherein
a plurality of said first projections are employed, and said plurality of first projections are arranged along an outer periphery of said lid portion, and are equally spaced from each other.

3. The lid for the mobile conunuication terminal according to claim 1, wherein
said first projection has a tip end thinner than a base end of said first projection.

4. The lid for the mobile communication terminal according to claim 1, wherein
a volume of said second projection is smaller than that of said first projection.

5. The lid for the mobile communication terminal according to claim 1, further comprising:
a third projection for rotatably holding said lid portion.

6. The lid for the mobile communication terminal according to claim 5, further comprising:
an arm extending from said lid portion along the front surface of said lid portion, wherein
said third projection is formed at the rear surface of said arm.

7. The lid for the mobile communication terminal according to claim 6, wherein
a portion of said arm near said third projection has a thickness smaller than a thickness of a portion of said arm near a connection to said lid portion.

8. The lid for the mobile communication terminal according to claim 5, wherein
said third projection has a circular cylindrical portion and a large-diameter portion located on a tip end side with respect to said circular cylindrical portion and having a larger diameter than said circular cylindrical portion.

9. The lid for the mobile communication terminal according to claim 8, wherein
said third projection further has a tapered portion converging from said large-diameter portion toward the tip end.

10. The lid for the mobile communication terminal according to claim 1, wherein
said lid is made of at least one of elastomer and rubber.

11. The lid for the mobile communication terminal according to claim 1, wherein
said lid is employed for covering an earphone microphone terminal in said mobile communication terminal.

12. The lid for the mobile communication terminal according to claim 1, wherein
said lid is employed for covering a charging terminal in said mobile communication terminal.

13. The lid for the mobile communication terminal according to claim 1, wherein
said lid is employed for covering a card slot in said mobile communication terminal.

14. The lid for the mobile communication terminal according to claim 1, wherein
said mobile communication terminal is a mobile phone.

15. A mobile communication terminal comprising:
a mobile communication terminal body having an opening; and
the lid for the mobile communication terminal according to claim 1 employed for covering said opening.

* * * * *